United States Patent Office 3,097,234
Patented July 9, 1963

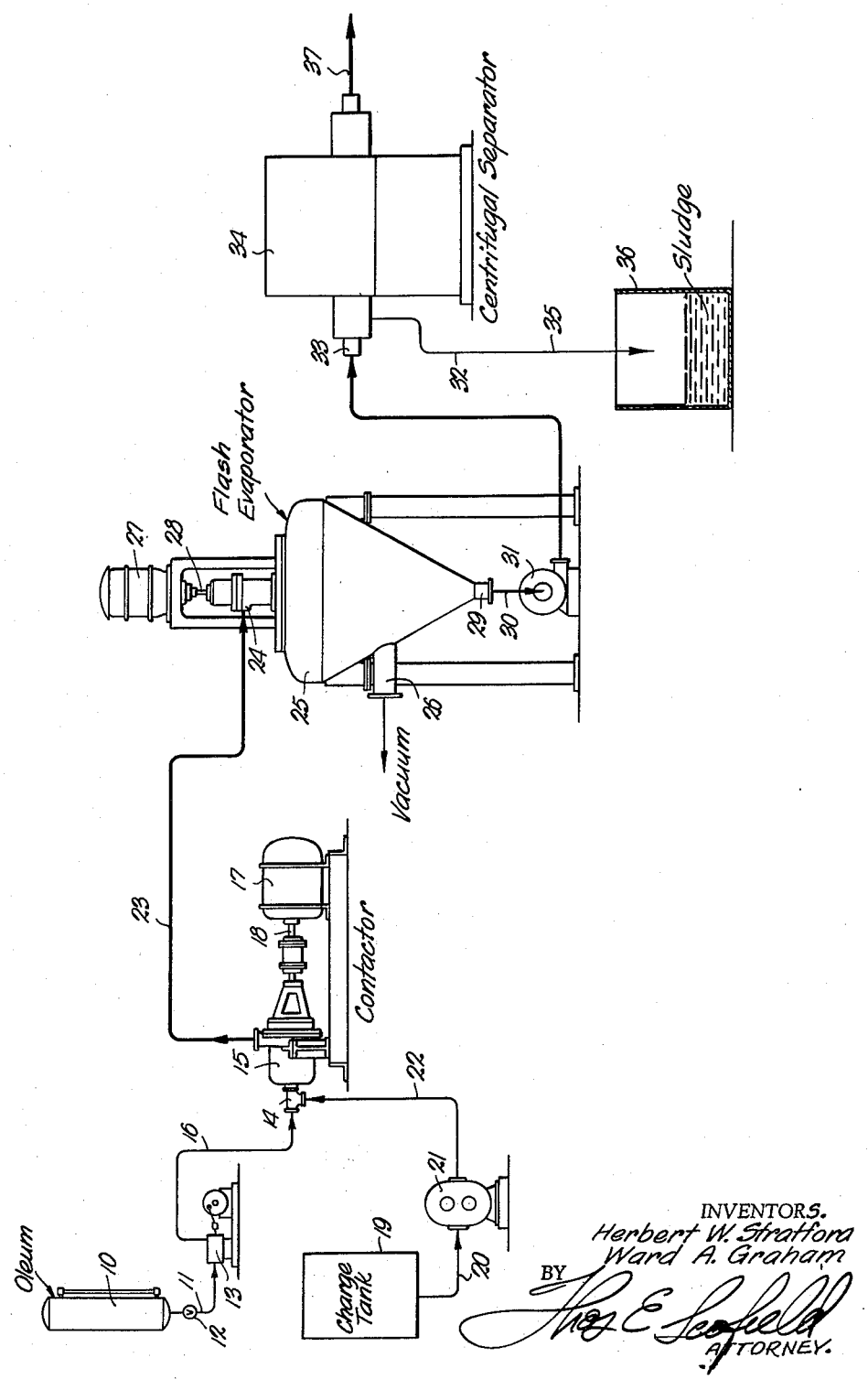

3,097,234
SULFUR DIOXIDE AND SLUDGE REMOVAL
PROCESS
Ward A. Graham, Kansas City, Mo., and Herbert W. Stratford, Kansas City, Kans., assignors to Stratford Engineering Corporation, Kansas City, Mo., a corporation of Delaware
Filed Apr. 8, 1959, Ser. No. 805,024
8 Claims. (Cl. 260—504)

This invention relates to the problem of sludge removal from chemical reactions in which sludge appears as a residue of the reaction and refers more particularly to chemical reactions such as those wherein sulfur trioxide or one of its hydrates is combined with hydrocarbons and sludge and sulfur dioxide are side products of the reaction and, also, the sulfur dioxide acts as a deterrent to the removal of the sludge from the reaction product.

Application Serial No. 689,841, "Lube Oil Treating Process," filed October 14, 1957, and now abandoned, inventor Herbert W. Stratford, discloses an acid treating process wherein a charge oil was first acid treated, then sludge extracted and the acid oil then neutralized. Application Serial No. 730,874, filed April 25, 1958, and now abandoned, "Sulfonation Methods," inventor Herbert W. Stratford, disclosed a process wherein charge oil was reacted with oleum, the treated oil then sludge extracted, the sludge extracted oil passed to a flash evaporator and then neutralized. Serial No. 730,848, filed April 25, 1958, "Sulfur Trioxide Sulfonation Method," inventor Herbert W. Stratford, disclosed a process wherein sulfur trioxide was reacted with charge oil, the sulfonated oil then sludge extracted and then passed to a sulfur dioxide flash evaporator.

It is thus well known from the above applications in the arts and processes of sulfonation, lube oil treating, and the like to (1) acid treat or sulfonate a charge oil, (2) phase extract the major portion of the sludge, (3) extract sulfur dioxide, and then (4) pass to some other well known process step such as neutralization, alcoholic extraction, or the like. A pepper sludge extraction step after (3) is also known but such a second sludge separation step is expensive, time consuming and employs a very expensive piece of apparatus. However, when it is not employed, less than ideal conditions result which give less than ideal product.

Therefore, an object of the instant invention is to provide a process for handling gas and sludge carrying reaction products which provides and requires only a single gas removal step followed by only a single sludge extraction step yet produces optimum sludge separation.

Another object of the invention is to provide a process for removing both gas and sludge from a chemical reaction product carrying gas and sludge in such manner as to provide optimum product with ideal characteristics despite the elimination of a second sludge extraction step.

Another object of the invention is to lessen the time in the gas and sludge extracting phases in a hydrocarbon treating process employing sulfur trioxide or one of its hydrates, whereby, since the qualities of the product (color and stability) deteriorate over time, a major advance is achieved. Additionally, by keeping the product in the acid state and at a high temperature a shorter time, disulfonation and side reactions are reduced.

Another object of the invention is to provide a shorter, simpler, less expensive sludge and gas extraction process which is carried out in conventional apparatus and by conventional processes yet which achieve optimum product with ideal characteristics.

Other and further objects of the invention will appear in the course of the following description thereof.

In the drawings, which form a part of the instant invention and are to be read in conjunction therewith, a schematic flow diagram of an embodiment of the invention is shown.

The process will be described in the schematic flow diagram of the FIGURE as applied to a lube oil treating or sulfonation process. However, it should be understood that the invention covers, as well, any process where sulfuric acid, oleum or sulfur trioxide are employed to acid treat any sort of hydrocarbon and gas bound sludge is a reaction product and, further, applies to any chemical reaction wherein sludge is a by-product of the reaction and is held in suspension by one or more gases which may be a by-product of the reaction.

Referring, then, to the drawing, at 10 is shown an oleum storage tank, from which flowline 11, controlled by valve 12, passes to pump 13. Flowline 16 passes from pump 13 to the inlet 14 of acid contactor 15. Contactor 15 is preferably of a type such as that disclosed in U.S. Patent No. 2,880,307, issued July 23, 1957, inventor David H. Putney, entitled "Method and Apparatus for Controlling Temperature Changes of Blends of Fluids or Fluids and Finely Divided Solids."

Charge tank 19 holds the charge oil or hydrocarbon which may be a sulfonatable hydrocarbon, a sulfonatable petroleum distillate, or sulfonatable petroleum lube stock, as examples. The charge stock from tank 19 passes through line 20, pump 21 and line 22 to the inlet fitting 14 of the acid contactor. The acid and charge oil mixture are thoroughly mixed in the contactor under the action of motor 17 driving shaft 18, which turns an impeller (not shown) in the contactor 15 which circulates the mixture through and around a circulating tube (also not shown) within the contactor. The acid treated charge oil is taken off as effluent from the contactor 15 through line 23 and passed to the input head 23 of flash evaporator 25. An atomizing or flash evaporator of the type shown in the Patent No. 2,368,049 to C. W. Stratford, issued January 23, 1945, entitled "Atomizing Evaporator," is satisfactory for the degasification step. Another operative flash evaporator is that shown in the Herbert W. Stratford application Serial No. 687,952, filed October 3, 1957, now Patent No. 2,990,011, entitled "Flash Evaporator Rotor." In the flash evaporator, the mixture is dispersed into a zone of low pressure whereby to be dehydrated and deaerated. A vacuum is pulled through line 26 of the evaporator 25. Motor 27 drives a rotating spray head (not shown) within the flash evaporator through shaft 28 in the deaerating apparatus example shown. It should be understood that a thorough degasification is all that is required at this stage, which may be accomplished by several known forms of apparatus, it but being necessary that the mixture be sufficiently dispersed within a zone of low pressure to substantially remove all entrained gases from said mixture. A number of conventional vacuum separation degasifiers could be employed or, for example, bubbling the mixture over bubble trays would suffice. Minimum residence time is desired. The flashed mixture passes from output fitting 29 through output line 30, pump 31 and line 32 to the input fitting 33 of the phase separator or sludge extractor indicated at 34. The sludge extraction or phase separation indicated at numeral 34 may be accomplished by a device such as is shown in Patent No. 2,670,132, inventor Walter J. Podbielniak, issued February 23, 1954, entitled "Centrifugal Counter-current Contact Apparatus." On the other hand, the acid sludge may be separated in other conventional manners from the acid treated and flashed mixture such as in a settler, a centrifuge or by methods of electrical separating, well known in the art. Minimum residence time, however, is desired. The sludge is withdrawn from the separator 34 through line 35 and passed to waste as at 36. The flashed sludge extracted, acid oil or hydrocarbon is then passed through line 37 to other processing steps such as neutralization, alcohol extraction, or the like.

A specific example of a compound which could be acid treated with either oleum or sulfur trioxide and sludge extracted as in the instant process would be dodecyl benzene. In the application of Herbert W. Stratford, Serial No. 730,848, on pages 4 and 5, lists of organic compounds within the broad classes of sulfonatable organic charging stocks are given. These lists are referred to here as typical of hydrocarbon compounds which might be employed in a "sulfonation process," comprise "sulfonatable organic compounds," are acted on by a "sulfonating agent," under "sulfonating conditions."

Further, as an example, it was desired to sulfonate a quantity of medium viscosity petroleum lubricating oil stock (300 to 400 SSU at 100° F.) at the rate of 1½ pounds oleum per gallon of oil, while extracting the sulfur dioxide generated during the sulfonation reaction in a contactor prior to the major phase separation. Using a hookup identical to that shown in the drawing, we were able to remove substantially all of the $SO_2$ and the very short residence time in the acid condition did not regenerate sufficient amount of $SO_2$ to be of any difficulty. After the $SO_2$ extraction, the sludge extractor was able to reduce the sludge content to substantially zero. To reconfirm this point, we shut off the vacuum to the $SO_2$ flash evaporator, continued the run and noted that the residual B.S. increased from substantially zero to .1 percent with no other changes being made. Another interesting aspect relative employing the flash evaporator between the contactor and the sludge extractor was that, employing the flow plan of the FIGURE, the acid oil accumulatable from line 37 in the product run tank, showed just a very faint trace of $SO_2$. When the vacuum to the flash evaporator was shut down, it was impossible for an individual to stand near the product run tank due to the evolution of $SO_2$ from the sour oil. That is, with the vacuum to the evaporator shut down, the product coming from the sludge extractor discharge line had the appearance of substantially a hot "beer." However, when the vacuum was pulled on the flash evaporator whereby to remove the $SO_2$ from the sulfonated material, the product from the sludge extratcor had a bright clear color and the appearance of a finished product.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. A method of treating hydrocarbons with one of the group consisting of sulfur trioxide, oleum and sulfuric acid (hereinafter called "acid") comprising the steps of first contacting the hydrocarbon and the acid in a reaction step, withdrawing a mixture of reaction product and sludge and any entrained gases from said reaction step, removing said gases from said withdrawn mixture under vacuum, and then extracting sludge from said mixture in a phase separating step.

2. A method as in claim 1 wherein the acid comprises sulfur trioxide.

3. A method as in claim 1 wherein the acid comprises oleum.

4. A method as in claim 1 wherein the acid comprises sulfuric acid.

5. A method of treating hydrocarbons with one of the group consisting of sulfur trioxide, oleum and sulfuric acid (hereinafter called "acid") comprising the steps of first contacting the hydrocarbon and the acid in a reaction step, withdrawing a mixture of reaction product and any entrained gas and sludge from said reaction step, dispersing said withdrawn mixture at a high velocity in a zone of substantially reduced pressure to remove said entrained gas, and then extracting sludge from said mixture in a phase separating step.

6. A method of sulfonating sulfonatable hydrocarbons with oleum comprising the steps of first contacting the oleum and a sulfonatable hydrocarbon in a reaction step, withdrawing a mixture of reaction product and any sludge and gas formed from said reaction step, then dispersing the mixture under vacuum to remove volatiles, including any entrained gas including sulfur dioxide, and then extracting sludge from said mixture in a phase separating step.

7. A method of sulfonating sulfonatable hydrocarbons with sulfur trioxide comprising the steps of first contacting sulfur trioxide and a sulfonatable hydrocarbon in a reaction step, withdrawing a mixture of reaction product and any sludge and gas formed from said reaction step, then dispersing the mixture in a vacuum to remove volatiles including entrained gas, and then extracting the sludge from said mixture in a phase separating step.

8. In a method of treating hydrocarbon lube stocks with one of the group consisting of sulfur trioxide, oleum and sulfuric acid (hereinafter called "acid"), the steps of first contacting the acid and the lube stock in a reaction step, then withdrawing a mixture of reaction product and any sludge and gas formed from said reaction step, then dispersing the mixture in a vacuum to remove volatiles, including any entrained gas, and then extracting sludge from said mixture in a phase separating step.

References Cited in the file of this patent

UNITED STATES PATENTS

| | | |
|---|---|---|
| 2,623,076 | Roebuck | Dec. 23, 1952 |
| 2,802,026 | Hennig et al. | Aug. 6, 1957 |
| 2,885,355 | Schneider et al. | May 5, 1959 |
| 2,908,638 | Fear | Oct. 13, 1959 |